(12) United States Patent
Ramirez et al.

(10) Patent No.: US 10,218,883 B2
(45) Date of Patent: Feb. 26, 2019

(54) DIGITAL IMAGING AND ANALYSIS SYSTEM

(71) Applicant: Board of Regents, The University of Texas System, Austin, TX (US)

(72) Inventors: Gesuri Ramirez, El Paso, TX (US); Geovany Ramirez, El Paso, TX (US); Craig Tweedie, El Paso, TX (US); Emmanuel Ochoa, South San Francisco, CA (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 15/202,890

(22) Filed: Jul. 6, 2016

(65) Prior Publication Data

US 2017/0013176 A1   Jan. 12, 2017

Related U.S. Application Data

(60) Provisional application No. 62/189,278, filed on Jul. 7, 2015.

(51) Int. Cl.
*H04N 5/225* (2006.01)
*H04N 5/33* (2006.01)
*H04N 9/67* (2006.01)

(52) U.S. Cl.
CPC ......... *H04N 5/2252* (2013.01); *H04N 5/2258* (2013.01); *H04N 5/332* (2013.01); *H04N 9/67* (2013.01)

(58) Field of Classification Search
CPC .......... H02H 3/202; H02H 3/22; H02H 7/006; H02H 7/1252; H02M 1/4208; H04N 5/2252; H04N 5/2258; H04N 5/332; H04N 9/67; Y02B 70/126
USPC .......................................................... 348/143
See application file for complete search history.

(56) References Cited

U.S. PATENT DOCUMENTS

| | | |
|---|---|---|
| 7,266,218 B2 | 9/2007 | Call et al. |
| 7,471,334 B1 | 12/2008 | Stenger |
| 8,379,913 B1 | 2/2013 | Robinson et al. |
| 8,457,360 B2 | 6/2013 | Robert et al. |
| 8,644,547 B2 | 2/2014 | Hodder et al. |

(Continued)

OTHER PUBLICATIONS

Bora et al, Comparing the performance of L*A*B and HSV color spaces with respect to color image segmentation (Year: 2015).*

(Continued)

*Primary Examiner* — Shan E Elahi
(74) *Attorney, Agent, or Firm* — Yee & Associates, P.C.

(57) ABSTRACT

A digital imaging and analysis system and method. The digital cameras and logger is encased by a weatherproof housing for easy deployment and maintenance of the camera and logger and protection from harsh conditions. The digital camera is associated with a memory to which imagery acquired by the digital camera is saved. The digital camera and logger can be customized and pre-programmed and the imagery subject to custom visualization. Sensors are electronically associated with the digital camera and are triggered to permit the digital camera to acquire the imagery and image the same image footprint in RGB, HSV, l*a*b* color spaces. Selectable regions of interest with respect to the imagery are saved in the memory.

20 Claims, 11 Drawing Sheets

(56) References Cited

U.S. PATENT DOCUMENTS

| | | | |
|---|---|---|---|
| 8,908,997 B2 | 12/2014 | Retterath et al. | |
| 2009/0016565 A1 | 1/2009 | Kulumani | |
| 2010/0036269 A1* | 2/2010 | Ferren | A61B 5/02007 |
| | | | 600/504 |
| 2010/0277752 A1* | 11/2010 | Tin | H04N 1/603 |
| | | | 358/1.9 |
| 2012/0038766 A1 | 2/2012 | Park et al. | |
| 2013/0235234 A1 | 9/2013 | Cucci et al. | |
| 2014/0028800 A1* | 1/2014 | Tin | G01N 21/55 |
| | | | 348/46 |
| 2014/0028801 A1* | 1/2014 | Tin | G01N 21/55 |
| | | | 348/46 |
| 2014/0240505 A1 | 8/2014 | O'Donnell et al. | |
| 2014/0333802 A1* | 11/2014 | Arai | H04N 5/2258 |
| | | | 348/239 |
| 2014/0379588 A1* | 12/2014 | Gates | G06Q 10/0631 |
| | | | 705/308 |
| 2015/0015697 A1* | 1/2015 | Redden | G01N 33/0098 |
| | | | 348/89 |
| 2015/0022685 A1* | 1/2015 | Gish | H04N 1/60 |
| | | | 348/223.1 |
| 2015/0145966 A1* | 5/2015 | Krieger | G06T 17/20 |
| | | | 348/47 |

OTHER PUBLICATIONS

Horstmeyer et al, Multispectral image segmentation (Year: 2010).*
Graphical user interface—Wikipedia, the free encyclopedia, printed Jun. 15, 2016, 10 pages.
Lab color space—Wikipedia, the free encyclopedia, printed Jun. 15, 2016, 9 pages.

* cited by examiner

DIGITAL IMAGING AND ANALYSIS SYSTEM

CROSS-REFERENCE TO PROVISIONAL APPLICATION

This nonprovisional patent application claims the benefit under 35 U.S.C. § 119(e) to U.S. Provisional Patent Application Ser. No. 62/189,278 filed on Jul. 7, 2015, entitled "Digital Imaging and Analysis System," and which is hereby incorporated by reference in its entirety.

TECHNICAL FIELD

Embodiments are related to digital cameras, environmental data logger, image-processing systems and techniques, and analytical software development. Embodiments further relate to the acquisition and analysis of imagery acquired by multispectral digital cameras. Embodiments also relate to digital cameras and data loggers that can be utilized in rugged and remote environments.

BACKGROUND

Over the past decade, environmental scientists have increasingly used low-cost sensors and custom software to gather and analyze environmental data. Included in this trend has been the use of imagery from digital cameras and data loggers. Published literature has highlighted the challenge scientists have encountered with poor and problematic camera and logger performance and power consumption, limited capacity for the acquisition of coupled environmental data, limited capacity for 'smart' sensors to trigger altered measurement states based on environmental thresholds, limited data download and wireless communication options, general ruggedness of off the shelf camera solutions, and time consuming and hard-to-reproduce digital image analysis options.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking into consideration the entire specification, claims, drawings, and abstract as a whole.

It is, therefore, one aspect of the disclosed embodiments to provide for an improved digital imaging, data logging, and analysis system and method thereof.

It is another aspect of the disclosed embodiments to provide for a coupled camera-logger system that can be employed to acquire imagery and other data from a fixed point and/or a moving platform.

The aforementioned aspects and other objectives and advantages can now be achieved as described herein. Digital image and analysis methods and systems are disclosed. A weatherproof housing to aid deployment and maintenance of the camera-logger under harsh conditions can encase the digital camera and a logger. The digital camera and logger is electronically associated with a memory to which imagery and data acquired by the digital camera and sensors respectively is saved. The digital camera and logger can be customized and pre-programmed and the imagery and data can be analyzed with custom software, which also produces custom visualizations. One or more sensors can communicate electronically with the logger and can be triggered to permit the digital cameras to acquire repeat digital imagery and movies of the same image footprint in RGB, HSV, L*a*b*, thermal, and Near Infrared color spaces. Selectable regions of interest with respect to the imagery can be saved in the memory and are used to analyze spectral changes in the region of interest over time (repeat imagery).

In some example embodiments, environmental thresholds from one or more of the sensors linked to the data logger can be programmed to trigger the camera systems. In another example embodiment, the RGB digital image sensor can be configured to permit the imagery acquired by the digital camera to be viewed in RGB, HSV, and L*a*b* color spaces. In some example embodiments, sensors may be implemented as a group of imaging sensors including an image sensor, a thermal sensor, a long-wavelength infrared sensor, and/or a combination of such sensors. In still other example embodiments, at least one sensor can be implemented as an image sensor and at least one other sensor can be implemented as a thermal sensor. In yet other example embodiments, the sensors can be composed of an RGB digital image sensor, a true near infrared sensor, and a thermal sensor. In still another example embodiment, the aforementioned thermal sensor can be a long-wavelength infrared sensor and the RGB digital image sensor can permit the imagery acquired by the digital camera to be viewed in RGB, HSV, and L*a*b* color spaces.

In another example embodiment, a digital imaging and analysis system can be implemented, which includes: a digital camera encased by a weather-proof housing for easy deployment and maintenance of the digital camera and its protection under harsh conditions, which is associated with a memory to which imagery acquired by the digital camera is saved; wherein the digital camera is configured to be customized and pre-programmed, wherein imagery is subject to custom visualization; a plurality of sensors electronically associated with the digital camera which are triggered to permit the digital camera to acquire the imagery and image a same image footprint of the imagery in at least one color space; and wherein selectable regions of interest with respect to the imagery are saved in the memory.

In still another example embodiment, a method of configuring a digital imaging and analysis system can be implemented. Such an example method may include steps such as, for example, encasing a digital camera with a weather-proof housing for deployment and maintenance of the digital camera under harsh conditions, which is associated with a memory to which imagery acquired by the digital camera is saved; configuring the digital camera to be customized and pre-programmed, wherein imagery is subject to custom visualization; and electronically associating a plurality of sensors with the digital camera, wherein the plurality of sensors is triggerable to permit the digital camera to acquire the imagery and image a same image footprint of the imagery in at least one color space, and wherein selectable regions of interest can be analyzed for their spectral properties over the time series imagery saved in the memory.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
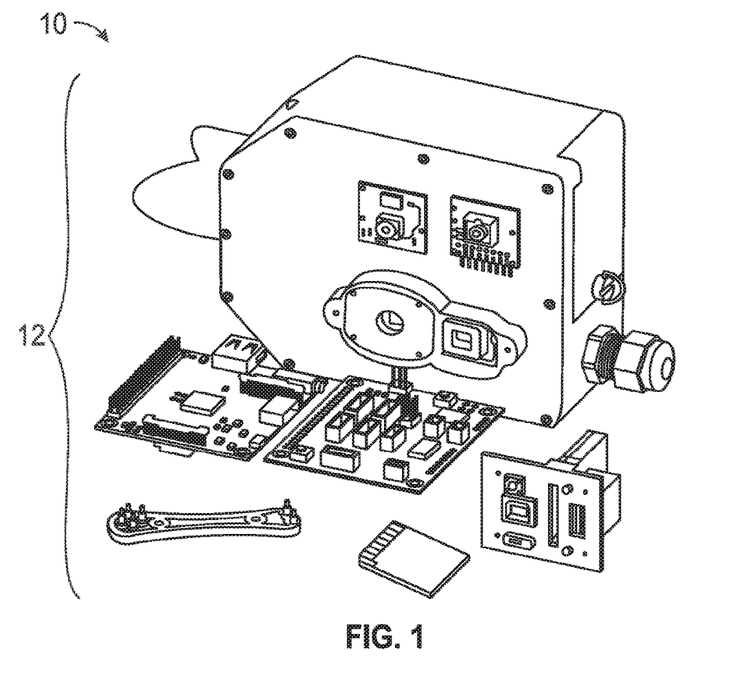
FIG. 1 illustrates a pictorial view of a camera system, which can be employed to acquire imagery from a fixed point and/or a moving platform, in accordance with a preferred example embodiment.

FIG. 1 illustrates a pictorial view of a camera and environmental sensing and logger system 10, which can be employed to acquire imagery and data from attached sensors from a fixed point and/or a moving platform, in accordance with a preferred embodiment. The camera and logger system 10 is shown in FIG. 1 with its major components 12. The camera and logger system 10 can be employed to obtain images from a fixed point (e.g., building, tower, post) and/or a moving platform (e.g., car, ATV, boat, UAV, aircraft, etc.). An external computer or data logging device is not needed for operation of the camera and logging system 10, but may be linked if needed for purposes such as control-enabled or enhanced real-time communication and image/data processing, linking to other sensor systems, etc.

In a preferred embodiment, the camera system 10 is battery powered and the battery system is recharged from solar or wind-powered charging systems. In alternative embodiments, however, the camera and logger system 10 is capable of being connected to line power (e.g., AC, USB, power over Ethernet) or an alternate energy source for remote deployment (e.g., wind, fuel cell). All hardware components are enclosed in a weather proof housing designed for easy deployment and maintenance and protection against the harsh conditions these systems have been designed for and are expected to run in (i.e., can be deployed and serviced with winter gloves on, gaskets are designed to handle repeat freeze-thaw expansion and contraction, etc.).

Figure 2:
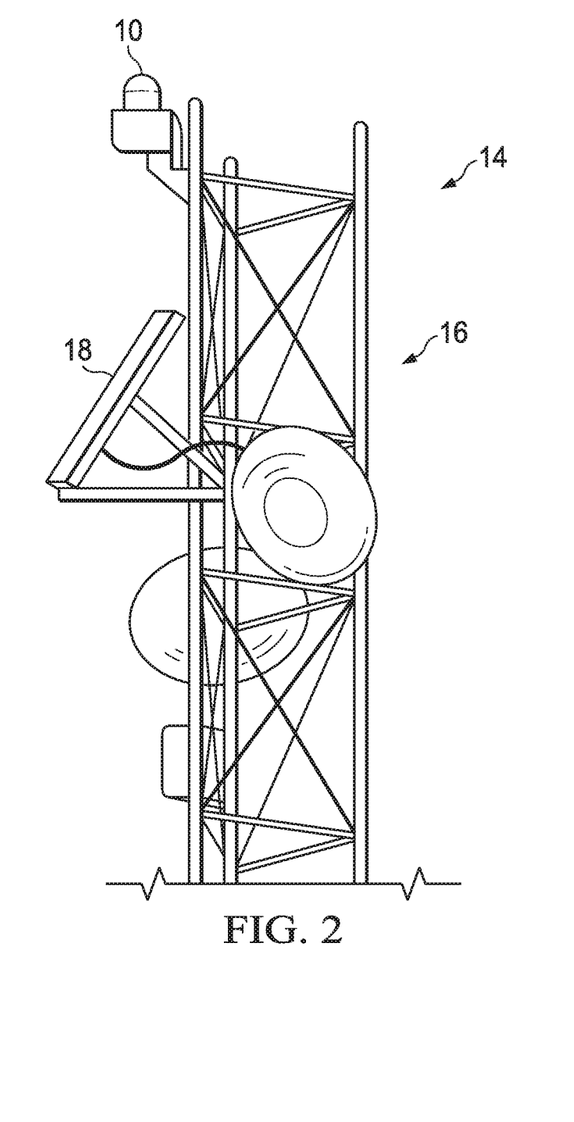
FIG. 2 illustrates a pictorial view of the camera system of FIG. 1 mounted in the context of a field deployment on top of a tower, in accordance with an alternative example embodiment.

FIG. 2 illustrates a pictorial view 14 of the camera and logger system 10 of FIG. 1 mounted in the context of a field deployment on top of a tower 16, in accordance with an alternative embodiment. FIG. 2 indicates that the camera and logger system 10 can be implemented in rugged and remote environments and with a solar panel 18, which collects solar energy for powering the battery system 10 as it collects data.

Figure 3:
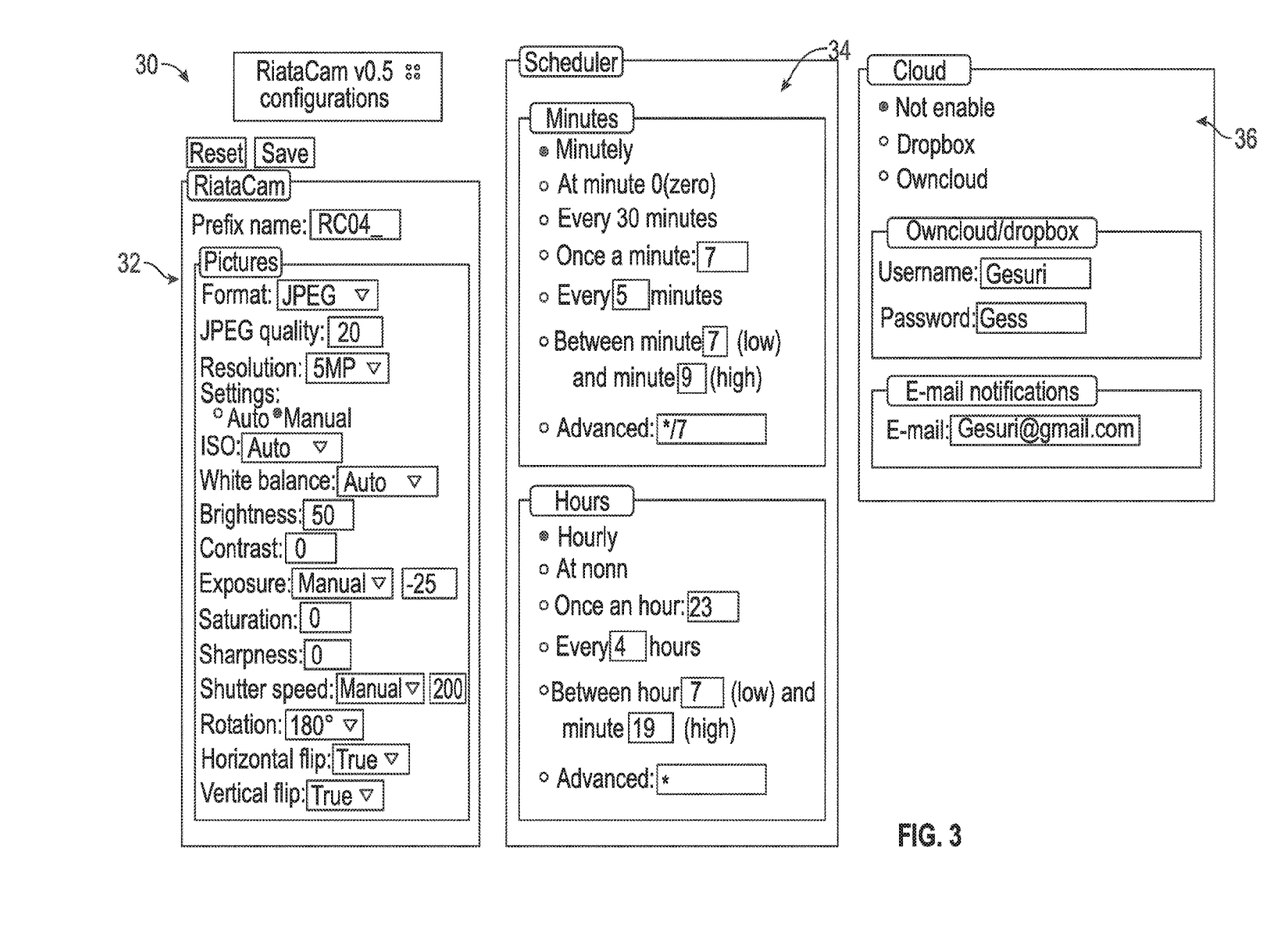
FIG. 3 illustrates a screen shot of an example GUI that can be employed for the configuration of the camera system shown in FIGS. 1-2, in accordance with a preferred example embodiment.

FIG. 3 illustrates a screen shot of an example GUI (Graphical User Interface) 30 that can be employed for the configuration of the camera system 10 shown in FIGS. 1-2, in accordance with a preferred embodiment. The GUI 30 includes a picture section 32 that allows a user to configure the camera system 10 according to format type, quality, brightness, balance, and so on. GUI 30 also includes a scheduler section 34 that a user can access to set various activities based on hours, minutes, etc. GUI 30 further includes a "cloud" section 36 that a user can access to configure settings such as cloud storage and email notification options. All hardware components of the camera and logger system 10 are preferably enclosed in a weather proof housing designed for easy deployment and maintenance and protection against harsh environmental conditions (i.e., can be deployed and serviced with winter gloves, etc.).

Figure 4:
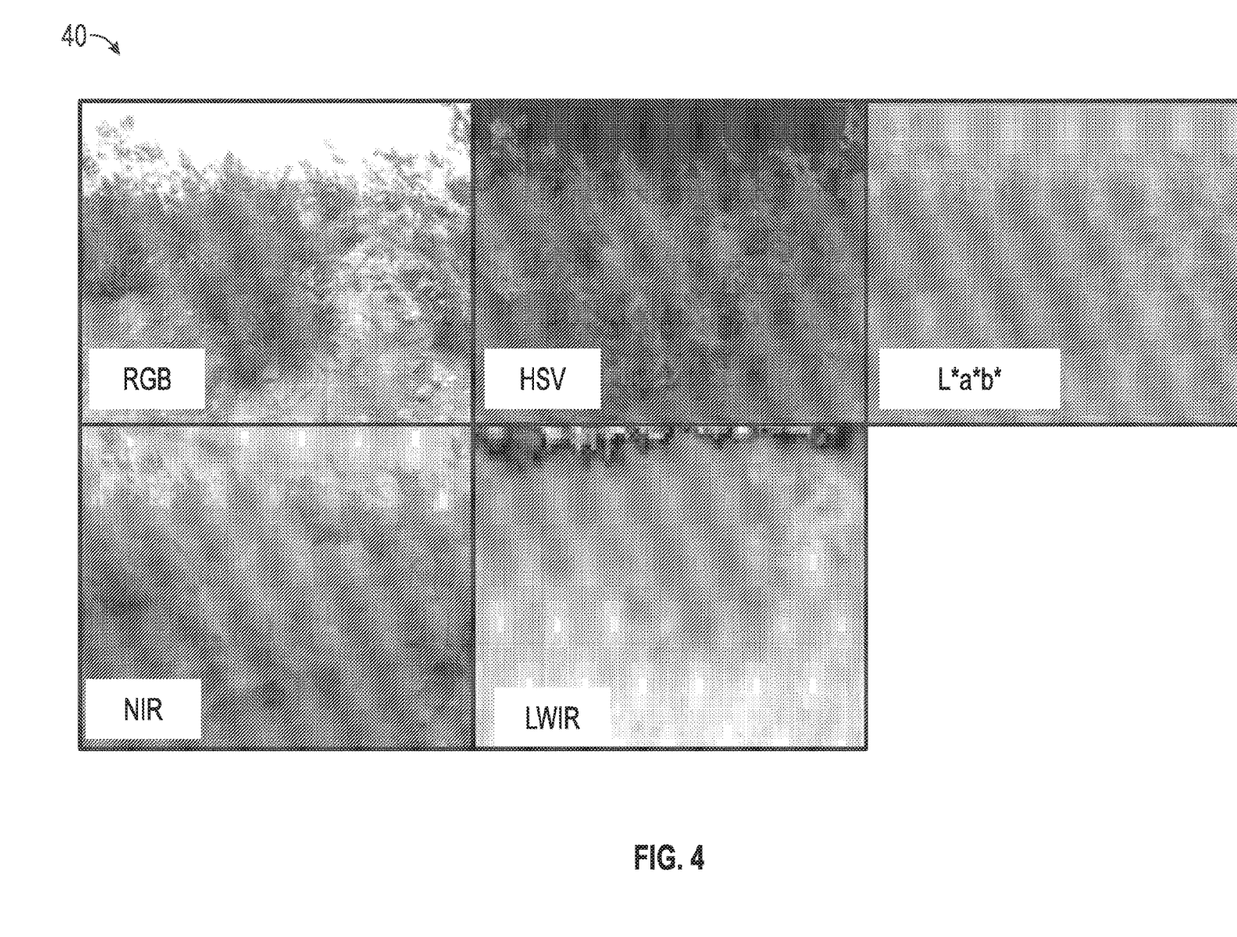
FIG. 4 illustrates example images capable of being acquired by the camera system shown in FIGS. 1-2, in accordance with a preferred example embodiment.

Note that the term "GUI" or "Graphical user Interface" as utilized herein refers to an interface that allows a user to interact with electronic devices such as the camera and logger system 10 through, for example, graphically displayed icons and visual indicators such as secondary notation (as opposed to text-based interfaces), typed command labels, or text navigation. The actions in a GUI can be performed through direct manipulation of the graphical elements FIG. 4 illustrates example images 40 capable of being acquired by the camera and logger system 10 shown in FIGS. 1-2, in accordance with a preferred embodiment. The camera and logger system 10 can function in association with a variety of digital imaging sensors such as, for example, an RGB sensor, a true near Infrared sensor, and a thermal sensor as well as a range of environmental sensors that connect to the logger (e.g., commercial off the shelf or custom temperature, relative humidity, wind speed, wind direction, soil moisture, surface wetness). Thus, imagery acquired by the camera can include a digital image sensor in RGB (allows for imagery to be viewed in RGB, HSV, and L*a*b* color space), a true near Infrared sensor, and a thermal sensor (long-wavelength infrared). All sensors can be triggered to acquire imagery at the same time and for the same footprint.

The images 40 shown in FIG. 4 illustrate example imagery captured from the camera system in the northern Chihuahuan Desert. Digital imagery is shown in RGB, HSV, and L*a*b* color space (top). Imagery from the IR sensor and thermal sensor are also shown (bottom left and right, respectively). Note that as utilized herein, l*a*b (or "Lab") color space refers to a color-opponent space with dimension L for lightness and a and b for the color-opponent dimensions, based on nonlinearly compressed (e.g., CIE XYZ color space) coordinates.

The l*a*b* color space includes all perceivable colors, which means that its gamut exceeds those of the RGB and CMYK color models. One of the most important attributes of the l*a*b*-model is device independence. This means that the colors are defined independent of their nature of creation or the device they are displayed on. The l*a*b* color space can be used, for example, when graphics have to be converted from RGB to CMYK, as the l*a*b* gamut includes both the RGB and CMYK gamut. Also, it is used as an interchange format between different devices as for its device independency.

In some embodiments, imagery can be acquired at a resolution of 8 megapixels and can be stored in a range of standard file formats including JPEG, GIF, TIF, PNG, RAW. Video may also be obtained from the aforementioned sensor(s) in RGB or IR in full HD (e.g., 1080) or whole sensor resolution (e.g., 3264×2448). A range of analogue and/or digital sensors (temperature, motion, wind speed and direction, soil moisture, light, etc.) used by environmental scientists can be attached directly to the camera system, which can be programmed to record data as per a traditional data logger (e.g., 16 Bit). Such data can be stored in some embodiments in .csv files or in a binary file format.

Image and auxiliary data (i.e., additional sensors) can be acquired in response to a variety of triggers including time interval, external device (e.g., mechanical switch, computer, other instrument), and sensor state (e.g., commercial off the shelf or custom moisture, motion, and readout from other sensors). Communication to/from the camera and logger system includes a range of standardized options such as Wi-Fi, Bluetooth, Ethernet, USB, serial, GSM, and Iridium satellite phone. In some embodiments, data may also be downloaded from an SD card.

The camera and logger system 10 is programmable (e.g., Python, C, C++, Java, HTML) and users can either program their own functionality or use a custom interface to configure and control all aspects of its operation (time/event triggers for data acquisition, file format, file naming convention, image resolution, ISO, white balance, brightness, contrast, exposure, sharpness, saturation, shutter speed vertical/horizontal flip), communication, and telemetry, etc.

Users can setup diagnostics record files that include periodic recording of battery voltage, solar charging strength, Wi-Fi signal strength, and data transfer failures, etc. Diagnostic files and/or system failure can be downloaded as described below. Options for data transfer are also diverse. Users can download data manually using the range of options listed above, program the system to send data via email and/or social media (e.g., Facebook, Twitter), and/or send data to a server or cloud (e.g., Dropbox, Amazon, Google, other). Hence, the "cloud" configuration section 36 shown in FIG. 3. Note that the term "Wi-Fi" as utilized herein refers to WiFi, a communications technology that allows electronic devices to connect to a wireless LAN (local area network) mainly using the 2.4 gigahertz (12 cm) UHF and 5 gigahertz (6 cm) SHF ISM radio bands.

Figure 5:
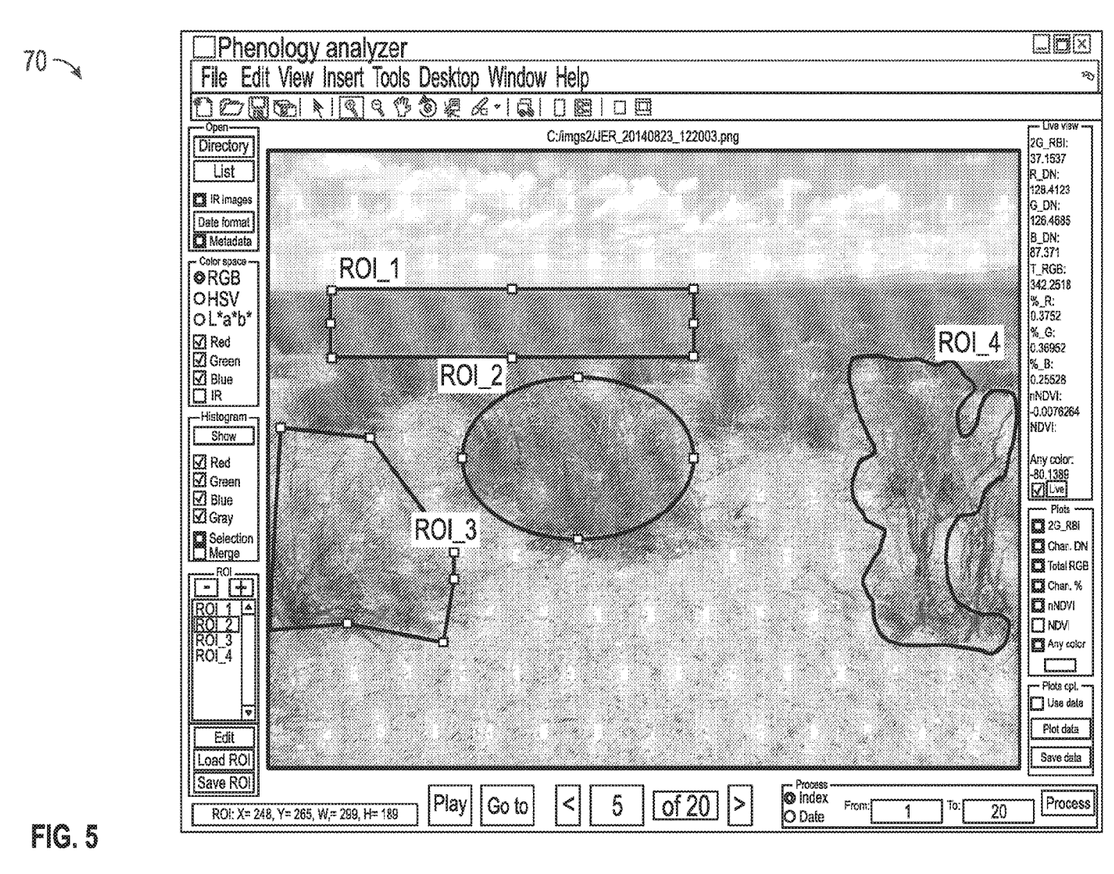
FIG. 5 illustrates a screen shot of an example GUI that can be employed for digital image analysis, in accordance with a preferred example embodiment.
Figure 6A:
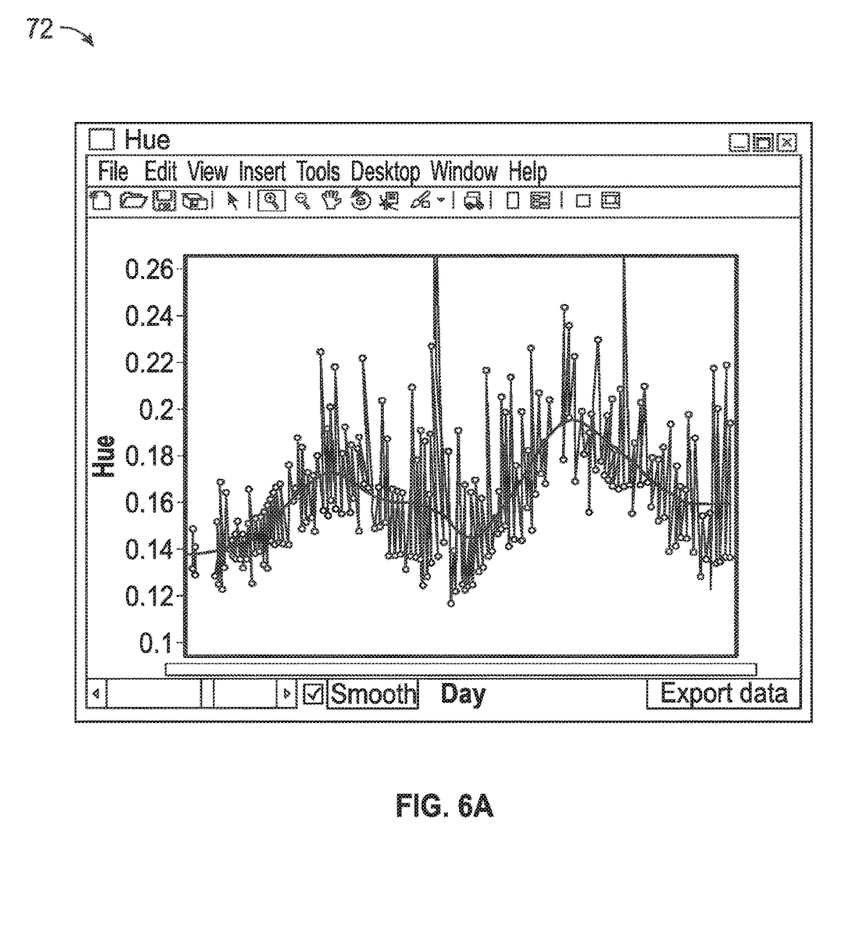
FIGS. 6A-6B illustrate example plots resulting from a digital image analysis involving an HSV color space, in accordance with a preferred example embodiment.
Figure 6B:
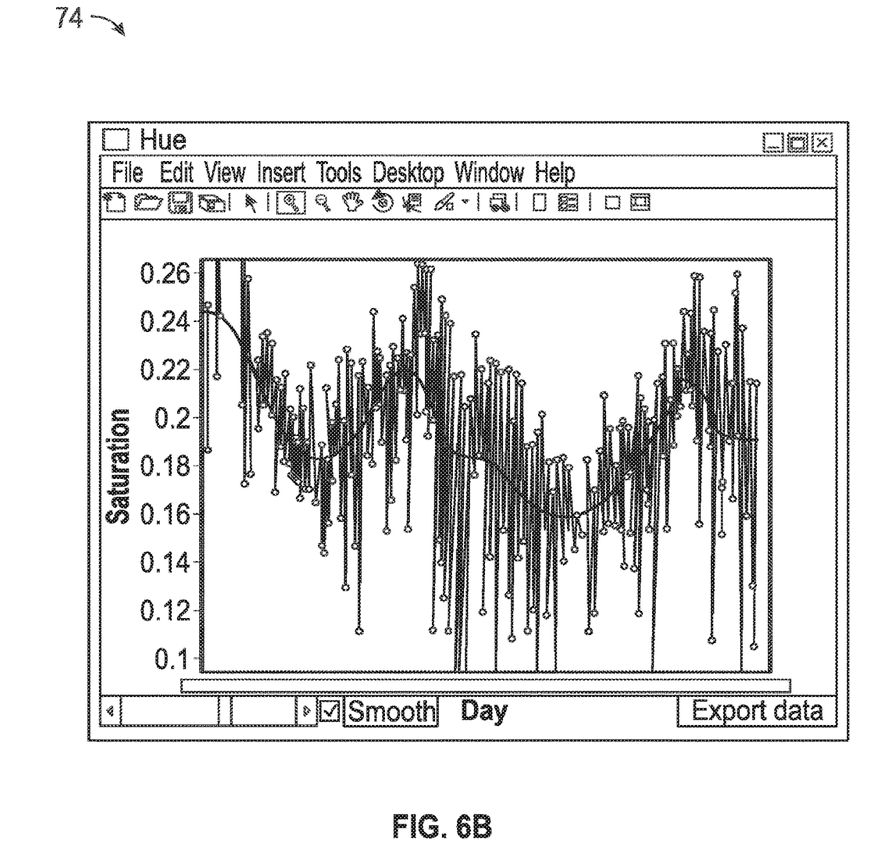

FIG. 5 illustrates a screen shot of an example GUI 70 that can be employed for digital image analysis, in accordance with a preferred embodiment. FIGS. 6A-6B illustrate example plots 72, 74 resulting from a digital image analysis of HSV color space, in accordance with a preferred embodiment. Image analysis software can be used to analyze imagery acquired by camera system 10 and/or acquired in standard file formats by other camera systems. The software can be installed within a few minutes and is compatible with MS Windows, Apple OSX, and Linux operating systems. Imagery can be loaded from a folder of imagery viewed as thumbnails or a text files with the list of images. Imagery metadata can also be viewed.

Users can scroll through the sequence of imagery using forward/backward buttons at the bottom of the software interface. Imagery can be viewed in RGB, HSV, and l*a*b* color space and each channel can be turned off/on separately to enhance image discovery and analysis.

In the lower left section of the GUI 70, users can define a region of interest (ROI) for analysis. ROI's can have multiple shapes (rectangle, ellipse, geometric (polygon) and/or be drawn in 'freehand'). Multiple ROIs can also be established for a given analysis and users can save the ROI's and load these in future analyses to ensure sampling footprints are fixed between analyses. When an ROI has been selected, readout for the selected color space appears in the 'live view' section of the user interface (upper right of GUI 70).

Users can then select a spectral index, which have been derived from published literature and are generally accepted by the scientific community, and/or choose to have analytical output reported as separate channel strengths for a given color space. When the analysis has been configured with a choice of folder and associated files, color space, ROIs, and spectral indices, users then choose to view the analysis in a plot and press the process button to execute the analysis. The software can typically process and plot results from a years' worth of data collection in a few minutes. Results of the analysis can be viewed in a plot and/or downloaded as, for example, a .csv file for additional analysis and visualization.

Figure 7:
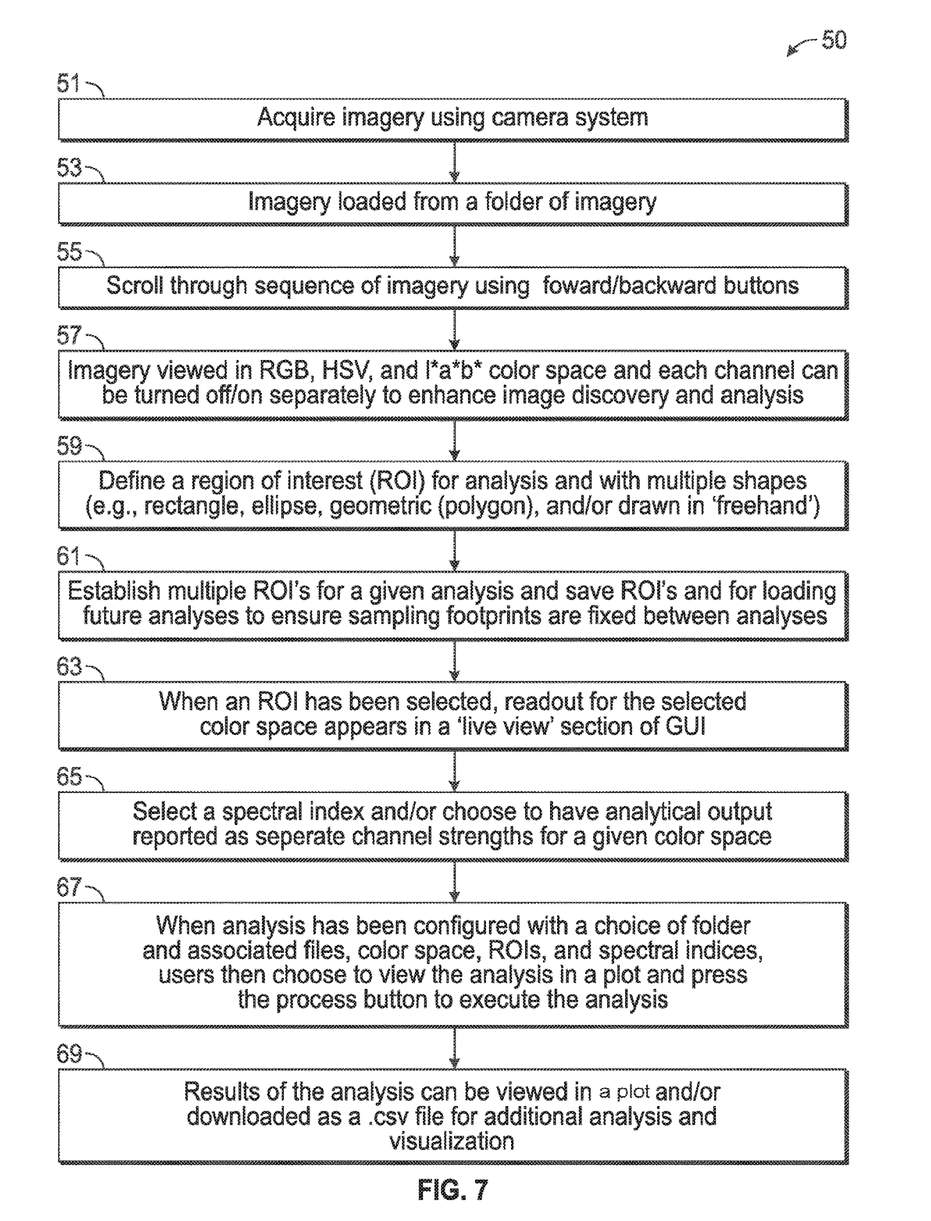
FIG. 7 illustrates a flow chart of operations depicting logical operational steps of a method for digital image analysis with respect to the disclosed camera system, in accordance with an alternative example embodiment.

FIG. 7 illustrates a flow chart of operations depicting logical operational steps of a method 50 for digital image analysis with respect to the disclosed camera and logger system 10, in accordance with an alternative embodiment. As indicated at block 51, imagery can be acquired using the disclosed camera and logger system 10. The imagery can be loaded, as indicated at block 53, from a folder of imagery viewed as thumbnails or a text file with the list of images. Imagery metadata can also be viewed as indicated previously. As shown next at block 55, users can scroll through the sequence of imagery using forward/backward buttons at the bottom of the GUI 70 discussed above.

As depicted next at block 57, imagery can be viewed via the GUI 70 in RGB, HSV, and L*a*b* color space and each channel can be turned off/on separately to enhance image discovery and analysis. As illustrated at block 59, users may define via the GUI 70, a region of interest (ROI) for analysis. As discussed above, ROI's can have multiple shapes (rectangle, ellipse, geometric (polygon), and/or be drawn in 'freehand'). Multiple ROIs can also be established, as depicted at block 61, for a given analysis and users can save the ROI's and load these in future analyses to ensure sampling footprints are fixed between analyses.

When an ROI has been selected as shown at block 63, readout for the selected color space appears in the 'live view' section of the GUI. Users can then select, as depicted at block 65, a spectral index, which are derived from published literature and are generally accepted by the scientific community, and/or choose to have analytical output reported as separate channel strengths for a given color space.

When the analysis has been configured with a choice of folder and associated files, color space, ROIs, and spectral indices, users can choose to view the analysis in a plot and press the process button to execute the analysis, as indicated at block 67. The software can typically process and plot results from a years' worth of data collection in a few minutes. Results of the analysis can be viewed in a plot and/or downloaded as a .csv file for additional analysis and visualization, as shown at block 69.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 8:
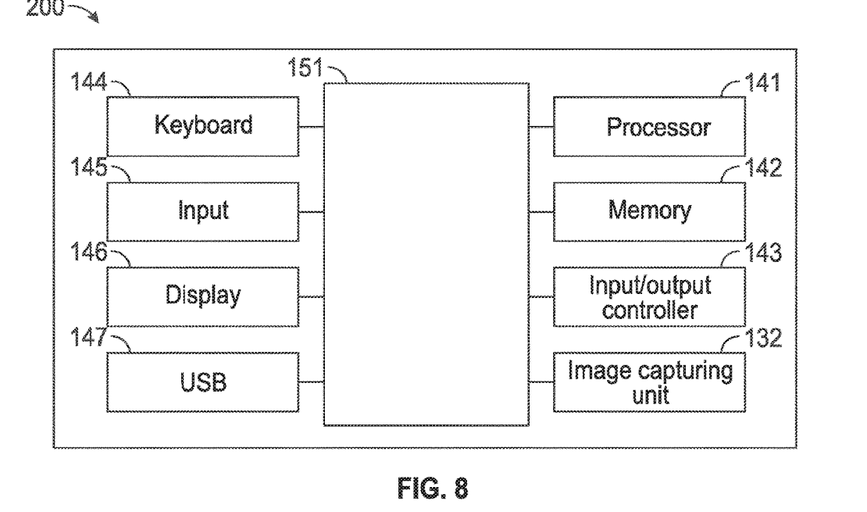
FIG. 8 illustrates a schematic view of a computer system, in accordance with an example embodiment.
Figure 9:
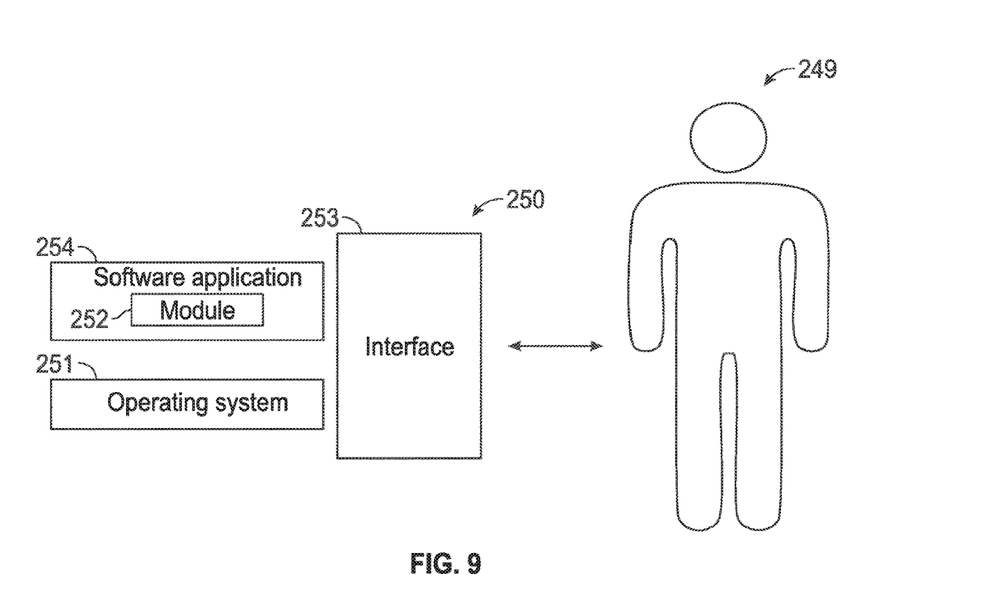
FIG. 9 illustrates a schematic view of a software system including a module, an operating system, and a user interface, in accordance with an example embodiment.

FIGS. 8-9 are provided as exemplary diagrams of data-processing environments in which embodiments of the present invention may be implemented. It should be appreciated that FIGS. 8-9 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 8, some embodiments may be implemented in the context of a data-processing system 200 that includes, for example, a processor 141 such as a CPU, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture.

The system bus 151 may be, for example, a subsystem that transfers data between, for example, computer components within data-processing system 200 or to and from other data-processing devices, components, computers, etc. It can be appreciated that some of the components shown in FIG. 8 are optional and desirable only in certain situations. For example, the image-capturing unit 132 may or not be included with data-processing system 200, but may be desirable in the case of, for example, Smartphone or laptop computer implementations, which often include a video camera. In a preferred embodiment, however, the image-capturing unit 132 may be implemented as or in association with the camera system 10 depicted in FIG. 1.

FIG. 9 illustrates a computer software system 250 for directing the operation of the data-processing system 200 depicted in FIG. 9. Software application 254 stored, for example, in memory 142 generally includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module 252 that can implement instructions or logical operations such as those described herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The module 252 shown in FIG. 9 can thus implement instructions such as those shown and described and illustrated herein with respect to, for example, FIG. 7. It can be appreciated, however, that such blocks/operations and instructions thereof are not limiting features of the disclosed embodiments. Other operations can be implemented with or in lieu of such instructions/operations.

FIGS. 8-9 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 10:
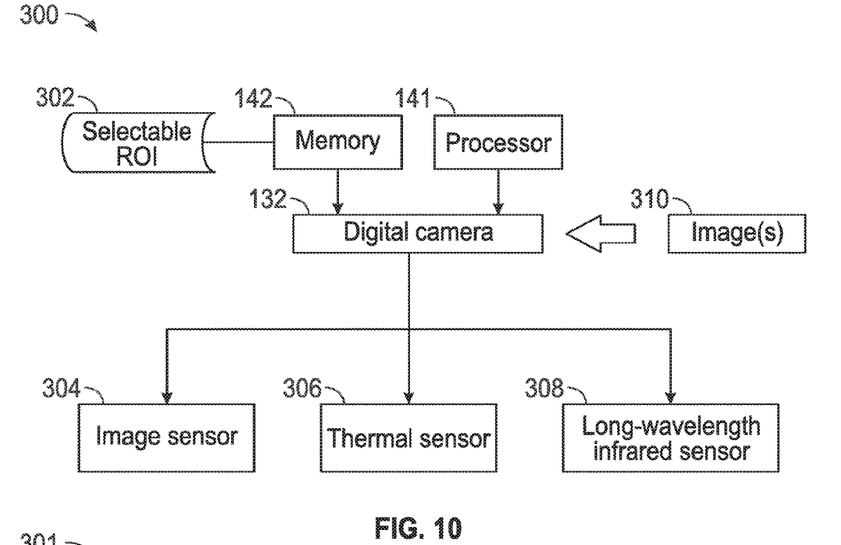
FIG. 10 illustrates a block diagram of a digital imaging, logging, and analysis system, which can be implemented in accordance with an example embodiment.

FIG. 10 illustrates a block diagram of a digital imaging and analysis system 300, which can be implemented in accordance with an example embodiment. In the example embodiment shown in FIG. 10, the system 301 can include a digital camera 132 that is encased by a weather-proof housing that allows the digital camera 132 to be deployed and maintained in harsh conditions as discussed previously. The digital camera 132 is associated or operably connected to memory 142 and/or a processor 141 (e.g., a CPU or other type of processor). An image 310 can be acquired by the digital camera 132 and saved in the memory 142 as digital data including, for example, data indicative of a selectable ROI (Region of Interest) 302. The digital camera and logger system 132 can be customized and pre-programmed (i.e., programmed beforehand or prior to deployment of the digital camera 132). The image (e.g., image 310) can be subject to custom visualization.

The system 300 can additionally include a group of sensors that includes, for example, an image sensor 304, a thermal sensor 306, and a long-wavelength near infrared sensor 308. Such sensors can be triggered to permit the digital camera to acquire imagery (e.g., image 310) and image the same image footprint with respect to the image 310 in, for example, one or more color spaces such as RGB, HSV, l*a*b* color spaces. The sensors 304, 306, and 308 are preferably electronically and operably connected to the digital camera 132. The selectable ROI 302 with respect to the acquired image 310 is saved in the memory 142.

Figure 11:
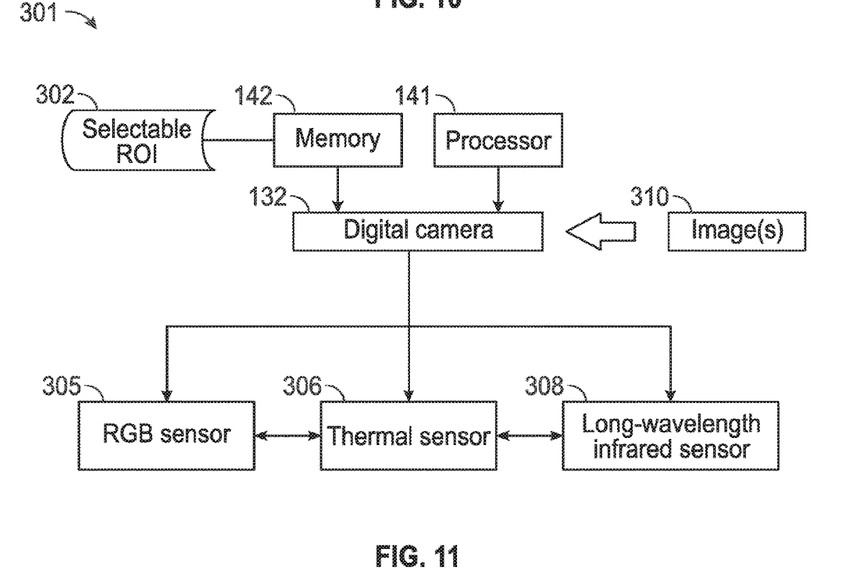
FIG. 11 illustrates a block diagram of a digital imaging, logging, and analysis system, which can be implemented in accordance with another example embodiment.

FIG. 11 illustrates a block diagram of a digital imaging and analysis system 301, which can be implemented in accordance with an example embodiment. The example embodiment shown in FIG. 11 is similar to the embodiment depicted in FIG. 10, the difference being that an RGB digital image sensor 305 is shown in association with the other sensors 306, 308. Also, in the example embodiment depicted in FIG. 11, the RGB sensor 305, the thermal sensor 306, and the long-wavelength infrared sensor 308 can communicate electronically with one another in addition to being operably connected to the digital camera 132. The ability for the sensors 305, 306, and 308 to communicate with one another may be helpful in cases where the sensors 305, 306, and 308 may need to be synchronized with one another for a particular action or exchange of data.

Figure 12:
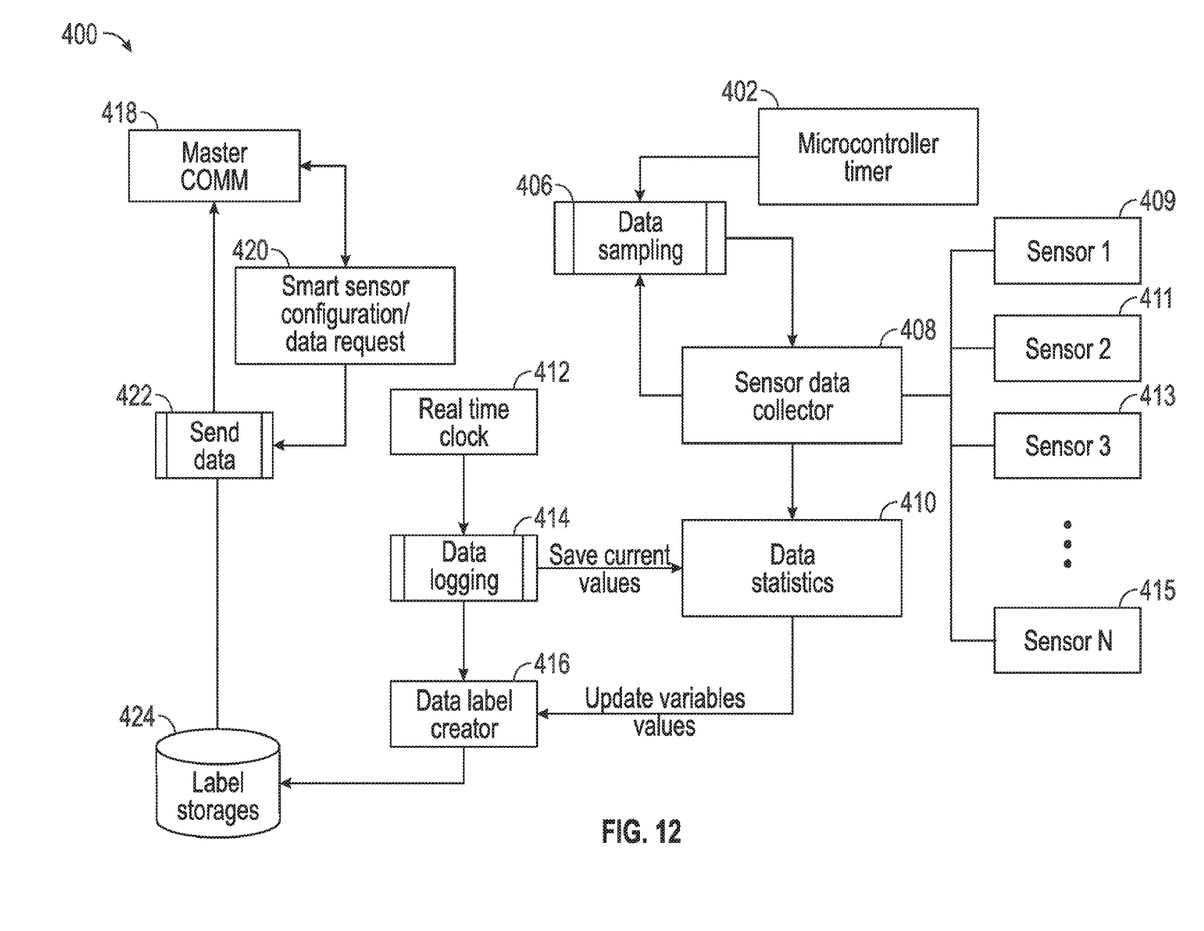
FIG. 12 illustrates a block diagram of a digital imaging, logging, and analysis system, which can be implemented in accordance with yet another example embodiment.

FIG. 12 illustrates a block diagram of a digital imaging, logging, and analysis system 400, which can be implemented in accordance with yet another example embodiment. In the example shown in FIG. 12, a group of sensors 409, 411, 413, and 415 can provide data to a sensor data collector 408, which operates with respect to a data sampling unit 406. A microcontroller timer 402 controls the data sampling unit 406 (and hence rates of data sampling). The data sampling unit 406 provides data which is input to the sensor data collector 408. The sensor data collector 408 generates data statistics 410 that provides as update variable values to a data label creator 416. A data logging unit 414 provides data which is input to the data label creator 416. The data logging unit 414 (i.e., which provides a data logging operation) also saves current values which are input with respect to the data statistics 410. A real time clock 412 is also operably connected to the data logging unit 414. A master COMM 418 is also shown in FIG. 12 and provides a smart sensor configuration/data request 420 which in turn operates with respect to a "send data" operation 422. That is, data stored in a label storages database 424 is sent to the master COMM 418 as facilitated by the send data operation 422. The database 424 also receives data from the data label creator 416.

Based on the foregoing, it can be appreciated that a number of example embodiments, preferred and alternative, are disclosed herein. For example, in one embodiment, a digital imaging and analysis system can be implemented. Such an example system can include a digital camera and logger encased by a weather-proof housing for easy deployment and maintenance and protection from harsh conditions, which is associated with a memory to which imagery acquired by the digital camera and logger is saved, wherein the digital camera is configured to be customized and pre-programmed, and wherein imagery is subject to custom visualization; a plurality of sensors electronically associated with the digital camera which are triggered to permit the digital camera to acquire the imagery and image a same image footprint of the imagery in RGB, HSV, l*a*b* color spaces. Additionally, selectable regions of interest with respect to the imagery are saved in the memory.

In some example embodiments, at least one sensor among the plurality of sensors can be an RGB digital image sensor. In yet another example embodiment, the RGB digital image sensor permits the imagery acquired by the digital camera to be viewed in HSV and L*a*b* color spaces. In some example embodiments, at least one sensor among the plurality of sensors can be, for example, an image sensor, a thermal sensor, a long-wavelength near-infrared sensor, and/or a combination of all such sensors. In still other example embodiments, at least one sensor among the plurality of sensors can be an image sensor and at least one other sensor among such sensors can be a thermal sensor. In other example embodiments, the plurality of sensors can be composed of an RGB digital image sensor, a true near infrared sensors, and a thermal sensor. In still another example embodiment, the aforementioned thermal sensor can be a long-wavelength infrared sensor and the RGB digital image sensor can permit the imagery acquired by the digital camera to be viewed in HSV and L*a*b* color spaces.

In another example embodiment, a digital imaging and analysis system can be implemented, which includes: a digital camera encased by a weather-proof housing for easy deployment and maintenance and protection from harsh conditions, which is associated with a memory to which imagery acquired by the digital camera is saved, wherein the digital camera is configured to be customized and pre-programmed, and wherein imagery is subject to custom visualization; a plurality of sensors electronically associated with the digital camera which are triggered to permit the digital camera to acquire the imagery and image a same image footprint of the imagery in at least one color space; and wherein selectable regions of interest with respect to the imagery are saved in the memory.

In still another example embodiment, a method of configuring a digital imaging and analysis system can be implemented. Such an example method may include steps such as, for example, encasing a digital camera with a weather-proof housing for deployment and maintenance of the digital camera and logger system under harsh conditions, which is associated with a memory to which imagery acquired by the digital camera is saved; configuring the digital camera to be customized and pre-programmed, wherein imagery is subject to custom visualization; and electronically associating a plurality of sensors with the digital camera, wherein the plurality of sensors is triggerable to permit the digital camera to acquire the imagery and image a same image footprint of the imagery in at least one color space, and wherein selectable regions of interest with respect to the imagery are saved in the memory.

In yet another embodiment, a digital imaging, environmental sensing and analysis system can be implemented which includes one or more multi-spectral digital cameras and a data logger encased by a weather-proof housing for easy deployment and protection of the digital camera and the data logger from harsh conditions, which is associated with a memory to which imagery acquired by the digital camera is saved, wherein the digital camera is configured to be customized and pre-programmed, wherein imagery is subject to custom visualization; a plurality of sensors electronically associated with the digital camera wherein data is stored and triggered to permit the digital camera to acquire the imagery and image a same image footprint of the imagery in RGB, HSV, l*a*b* color spaces; and wherein selectable regions of interest with respect to the imagery are saved in the memory.

In still another embodiment, a digital imaging and analysis system can be implemented, which includes a digital camera encased by a weather-proof housing for easy deployment and maintenance of the digital camera and a logger and protection from harsh conditions, which is associated with a memory to which imagery acquired by the digital camera is saved; wherein the digital camera is configured to be customized and pre-programmed, wherein imagery is subject to custom visualization; a plurality of sensors electronically associated with the digital camera which are triggered to permit the digital camera to acquire the imagery and image a same image footprint of the imagery in at least one color space; and wherein selectable regions of interest with respect to the imagery are saved in the memory (e.g., computer memory).

It will be appreciated that variations of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

What is claimed is:

1. A digital imaging, environmental sensing and analysis system, comprising:
   a camera and data logger system encased by a weather-proof housing for easy deployment and maintenance and protection of the camera and data logger system from harsh conditions, which is associated with a memory to which imagery acquired by said digital camera is saved; wherein the digital camera is configured to be customized and pre-programmed, said wherein imagery is subject to custom visualization;
   a plurality of sensors electronically associated with the camera and data logger system, wherein data is stored and environmental thresholds from one or more of the sensors linked to the data logger is programmed to trigger the camera system to permit the camera and data logger system to acquire said imagery and image a same image footprint of said imagery in RGB, HSV, l*a*b* color spaces; and
   wherein selectable regions of interest with respect to said imagery are saved in said memory.

2. The system of claim 1 wherein at least one sensor among said plurality of sensors comprises an RGB digital image sensor.

3. The system of claim 2 wherein said RGB digital image sensor permits said imagery acquired by said digital camera to be viewed in RGB, HSV, and l*a*b* color spaces.

4. The system of claim 1 wherein at least one sensor among said plurality of sensors comprises an image sensor.

5. The system of claim 1 wherein at least one sensor among said plurality of sensors comprises a thermal sensor.

6. The system of claim 5 wherein said thermal sensor comprises a long-wavelength infrared sensor.

7. The system of claim 1 wherein at least one sensor among said plurality of sensors comprises an image sensor and at least one other sensor among said plurality of sensors comprises a thermal sensor.

8. The system of claim 1 wherein said plurality of sensors comprise an RGB digital image sensor, a true near infrared sensor, and a thermal sensor.

9. The system of claim 8, wherein said thermal sensor comprises a long-wavelength infrared sensor and wherein said RGB digital image sensor permits said imagery acquired by said digital camera to be viewed in RGB, HSV, and l*a*b* color spaces.

10. A digital imaging and analysis system, comprising:
a camera and data logger system encased by a weather-proof housing for easy deployment and maintenance of the camera and data logger system and protection from harsh conditions, which is associated with a memory to which imagery acquired by the camera and data logger system is saved; wherein the camera and data logger system is configured to be customized and pre-programmed, wherein said imagery is subject to custom visualization;
a plurality of sensors electronically associated with the camera and data logger system which are triggered to permit said digital camera to acquire said imagery and image a same image footprint of said imagery in at least one color space; and
wherein selectable regions of interest with respect to said imagery are saved in said memory.

11. The system of claim 10 wherein said at least one color space comprises RGB, HSV, l*a*b* color spaces.

12. The system of claim 10 wherein at least one sensor among said plurality of sensors comprises an RGB digital image sensor.

13. The system of claim 12 wherein said RGB digital image sensor permits said imagery acquired by said digital camera to be viewed in HSV and l*a*b* color spaces.

14. The system of claim 10 wherein at least one sensor among said plurality of sensors comprises an image sensor.

15. The system of claim 10 wherein at least one sensor among said plurality of sensors comprises a thermal sensor.

16. The system of claim 15 wherein said thermal sensor comprises a long-wavelength infrared sensor.

17. A method of configuring a digital imaging and analysis system, said method comprising:
encasing a digital camera with a weather-proof housing for deployment and maintenance of said digital camera under harsh conditions, which is associated with a memory to which imagery acquired by said digital camera is saved;
configuring said digital camera to be customized and pre-programmed, wherein said imagery is subject to custom visualization; and
electronically associating a plurality of sensors with said digital camera; and
triggering the digital camera based on an environmental threshold from one or more of the sensors to acquire said imagery and image a same image footprint of said imagery in at least one color space, and wherein selectable regions of interest with respect to said imagery are saved in said memory.

18. The method of claim 17 wherein said at least one color space comprises RGB, HSV, L*a*b* color spaces.

19. The method of claim 17 wherein at least one sensor among said plurality of sensors comprises an RGB digital image sensor.

20. The method of claim 17 wherein at least one sensor among said plurality of sensors comprises an image sensor and at least one other sensor among said plurality of sensors comprises a thermal sensor.

* * * * *